United States Patent
Negre et al.

(10) Patent No.: US 9,685,902 B2
(45) Date of Patent: Jun. 20, 2017

(54) SYSTEM AND METHOD FOR CONTROLLING THE POWER SUPPLY OF AN ELECTRIC MACHINE ON THE BASIS OF THE TEMPERATURE THEREOF

(71) Applicant: RENAULT s.a.s., Boulogne-Billancourt (FR)

(72) Inventors: Edouard Negre, Montigny le Bretonneux (FR); Thibaut Baumann, Jouy en Josas (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/377,679

(22) PCT Filed: Feb. 1, 2013

(86) PCT No.: PCT/EP2013/052067
§ 371 (c)(1),
(2) Date: Aug. 8, 2014

(87) PCT Pub. No.: WO2013/117500
PCT Pub. Date: Aug. 15, 2013

(65) Prior Publication Data
US 2015/0029620 A1    Jan. 29, 2015

Related U.S. Application Data

(60) Provisional application No. 61/597,318, filed on Feb. 10, 2012.

(30) Foreign Application Priority Data

Feb. 10, 2012  (FR) ..................... 12 51283

(51) Int. Cl.
*H02H 5/04*     (2006.01)
*H02P 29/028*   (2016.01)
(Continued)

(52) U.S. Cl.
CPC ........... *H02P 29/028* (2013.01); *B60L 11/08* (2013.01); *H02P 29/032* (2016.02);
(Continued)

(58) Field of Classification Search
USPC ........... 318/706, 634, 641, 400.08, 788, 792
See application file for complete search history.

(56) References Cited

U.S. PATENT DOCUMENTS

| | | | |
|---|---|---|---|
| 2009/0111651 A1* | 4/2009 | Gale | F16H 59/72 477/98 |
| 2011/0050141 A1* | 3/2011 | Yeh | H02P 29/664 318/434 |
| 2011/0245034 A1* | 10/2011 | Yoshida | B60K 6/48 477/8 |

FOREIGN PATENT DOCUMENTS

| | | | |
|---|---|---|---|
| GB | 2478361 | 9/2011 | |
| GB | 2478361 A * | 9/2011 | ............ B60L 3/0061 |

(Continued)

OTHER PUBLICATIONS

International Search Report issued Feb. 18, 2014, in PCT/EP13/052067 filed Feb. 1, 2013.

(Continued)

*Primary Examiner* — Bentsu Ro
*Assistant Examiner* — Iftekhar Mustafa
(74) *Attorney, Agent, or Firm* — Oblon, McClelland, Maier & Neustadt, L.L.P.

(57) ABSTRACT

A control system for controlling power supply of an electric machine of an automobile and which contributes to movement thereof, wherein the control system is connected, at an input thereof, to a mechanism estimating a temperature of a rotor of the electric machine and to a temperature sensor measuring a temperature of a stator of the electric machine. The control system includes mappings of a set of values for allocating supply currents of the electric machine on the (Continued)

basis of torque and rotational speed request values received at the input of the control system, and includes a switching mechanism for selecting the mapping, the supply current signals of which are transmitted to the electric machine, on the basis of the signals from the mechanism estimating the temperature of the rotor and from the stator-temperature sensor.

8 Claims, 2 Drawing Sheets

(51) Int. Cl.
  *B60L 11/08* (2006.01)
  *H02P 29/032* (2016.01)
(52) U.S. Cl.
  CPC ... *B60L 2240/421* (2013.01); *B60L 2240/423* (2013.01); *B60L 2240/425* (2013.01); *B60L 2240/427* (2013.01); *B60L 2240/429* (2013.01); *B60L 2260/44* (2013.01); *Y02T 10/642* (2013.01); *Y02T 10/70* (2013.01); *Y02T 10/7077* (2013.01)

(56) References Cited

FOREIGN PATENT DOCUMENTS

| JP | 1-274685 | 11/1989 |
| JP | 2008-187862 | 8/2008 |
| JP | 2010-124610 | 6/2010 |

OTHER PUBLICATIONS

French Preliminary Search Report issued Nov. 28, 2012, in French Application No. 1251283 filed Feb. 10, 2012.

\* cited by examiner

SYSTEM AND METHOD FOR CONTROLLING THE POWER SUPPLY OF AN ELECTRIC MACHINE ON THE BASIS OF THE TEMPERATURE THEREOF

The technical field of the invention is the supply of power to electric motors and, more particularly, the supply of power to electric motors which are protected by a power limiter.

Electric machines generally comprise a moving part referred to as the rotor and a fixed part referred to as the stator. The rotor is set in motion by magnetic forces generated by the circulation of currents through the stator and through the rotor. In order to compete with internal combustion engines, the motive power of electric machines has been greatly increased over recent years. However, the circulation of currents through the rotor and through the stator causes heating through a Joule effect. Within the context of the control of electric machines, the temperature of the stator and of the rotor is monitored in order to prevent damage. Beyond a threshold temperature, the power is limited in order to keep the rotor or the stator below the temperature at which it sustains damage. Thus, the more the temperature increases beyond the threshold, the more the power is reduced. However, it may happen that only the rotor or only the stator is subject to heating, its counterpart remaining below the threshold temperature thereof. Because the motive power of the electric machine is dependent on the power circulating through the rotor and that circulating through the stator, any reduction of either of these leads to a reduction in the overall power of the electric machine.

There is a need for an electric machine control system that makes it possible to limit situations in which there is asymmetry in the heating of the rotor and of the stator.

The following documents are known from the prior art.

Document WO 2009003478 teaches how to limit power if the temperature of the components exceeds a critical threshold.

Document US 2006087789 describes a system in which the stator control circuit is switched off if the (reluctance) motor heats up beyond a certain temperature.

Document RU 2003 132783 describes electronic control of air cooling based on a fan for cooling the components.

Document U.S. Pat. No. 3,555,356 discloses a discrete electronic system for limiting current in order to protect the components from overheating.

Document WO 201140845 teaches reducing the voltage at the terminals of the rotor or the rotor current when the rotor temperature exceeds a temperature threshold.

Document GB 2478361 describes a system for protecting a motor against the overheating of its components, using a limitation on the motor torque setpoint as a refined function of the temperature of one of the components of the motor, it being possible for this component to be the magnets of the rotor or the coils of the stator.

Document JP 1274685 describes a system for protecting a motor against the overheating of its components, in which the difference in temperature between the stator and the rotor of the motor is taken into consideration in determining the torque setpoint.

None of the cited documents is able to combat the asymmetry between the heating of the rotor and the heating of the stator.

It is an object of the invention to reduce the differences in heating between rotor and stator in order to delay or eliminate the onset of power limitation in order to protect rotor and stator from damage.

There is proposed a system for controlling the supply of power to an electric machine with which a motor vehicle is equipped, the control system being connected at input to an estimating means for estimating the temperature of the rotor of the electric machine and to a temperature sensor that measures the temperature of the stator of the electric machine. The control system comprises a first currents map that is optimized for limiting electrical losses, a second currents map that is optimized for reducing losses in the rotor and increasing losses in the stator and a third currents map that is optimized for increasing losses in the rotor and decreasing losses in the stator, the maps containing a set of values that make it possible to determine electric machine supply currents on the basis of the torque and rotational speed request values received at input to the control system, the control system also comprising a switchover means able to choose the map, the supply current signals of which are transmitted to the electric machine on the basis of the signals from the means of estimating the temperature of the rotor and from the stator temperature sensor.

The control system may comprise a time-delay means able to delay the transmission of the signals from the maps or of the third map on the basis of the torque request signal. Such a control system offers the advantage of avoiding jolts when changing map.

Also proposed is a method for controlling the supply of power to an electric machine with which a motor vehicle is equipped and which contributes to the propulsion of said vehicle, the electric machine comprising a rotor provided with a means of estimating the temperature and a stator provided with a temperature sensor. The method comprises the following steps:
- an electric machine torque and rotational speed request is received,
- the temperature of the stator and the temperature of the rotor are determined,
- the difference between the temperature of the stator and the temperature of the rotor is determined,
- at least two electric machine supply current values that satisfy the torque and rotational speed request are determined,
- a supply current value is chosen on the basis of the temperature of the stator and of the temperature of the rotor and
- the chosen value is transmitted toward the electric machine.

If the rotor temperature is above a value of a first threshold and the difference between the rotor temperature and the stator temperature is above a value of a second threshold, it is possible for the value chosen to be the value from the electric machine supply currents that are optimized for reducing losses in the rotor and increasing losses in the stator.

If the stator temperature is above a value of a third threshold S3 and the difference between the stator temperature and the rotor temperature is above a value of a fourth threshold S4, it is possible for the value chosen to be the value from the electric machine supply currents that are optimized for increasing losses in the rotor and reducing losses in the stator.

If the difference between the rotor temperature and the stator temperature is less than the value of the second threshold, it is possible for the value chosen to be the value from the electric machine supply currents that are optimized for limiting electrical losses.

It is possible to defer the transmission of the electric machine supply current values until it has been determined that the torque request is below a value of a fifth threshold S5.

Further objects, features and advantages will become apparent from reading the following description given solely by way of nonlimiting example and made with reference to the attached drawings in which.

A wound rotor synchronous electric machine produces a torque, for a given rotational speed, that is dependent on the control currents supplied to the phases of the electric machine. It will be recalled that the rotor current is denoted If and that the stator is supplied with two currents denoted Id and Iq. There are a great many current triplets (Id, Iq, If) that allow a given torque value to be achieved. The triplet chosen, in nominal mode, is generally the one that will produce the least electrical losses. However, other triplets may be used to produce the same torque while at the same time limiting the release of heat at the rotor or at the stator.

In addition, by compensating for the imbalances that might arise between the temperatures of the stator and of the rotor, it is possible to avoid triggering a temperature-induced limitation on power more normally referred to in English as "temperature derating".

Figure 1:
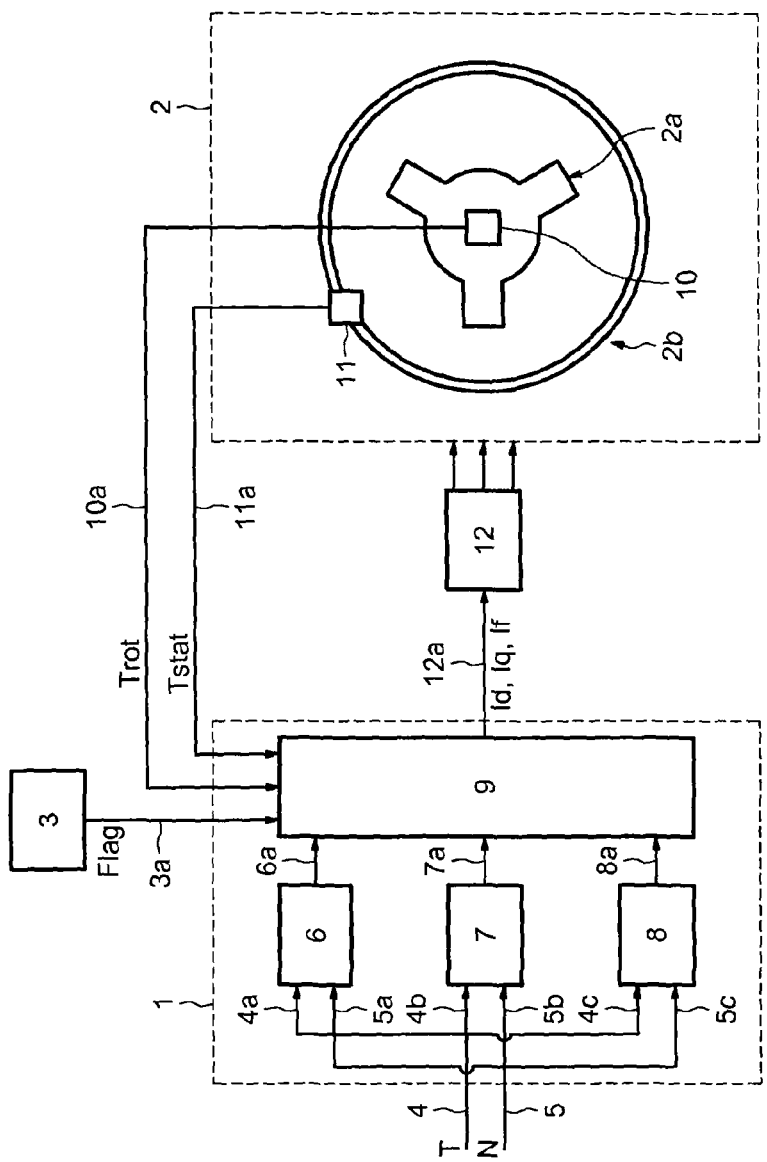
FIG. 1 illustrates the key elements of the power supply control system.

FIG. 1 shows a control system 1 for controlling the supply of power to an electric machine 2 comprising a rotor 2a and a stator 2b.

The system 1 for controlling the supply of power to an electric machine is connected at input to a system for controlling the power of an electric machine able to determine torque and rotational speed setpoints for said machine. The power supply control system 1 is also connected at input to a means 10 of estimating the temperature of the rotor 2a and to a temperature sensor 11 that measures the temperature of the stator 2b.

The power supply control system 1 may also be connected to a switch 3.

The power supply control system 1 comprises a first input connection 4 carrying a torque setpoint and a second input connection 5 carrying a rotational speed. The power supply control system 1 comprises a first map of the currents Id, Iq, If that is optimized for limiting electrical losses, a second map 7 of the currents Id, Iq, If that is optimized for reducing losses in the rotor and increase losses in the stator and a third map 8 of the currents Id, Iq, If that is optimized for increasing losses in the rotor and decreasing losses in the stator. The maps contain a set of values that allow the electric machine power supply phase currents Id, Iq, If to be assigned to a torque of requested value T and rotational speed N.

The first map is connected at input to the first input connection 4 by the branch 4a and to the second input connection 5 by the branch 5a. Likewise, the second map is connected at input to the first input connection 4 by the branch 4b and to the second input connection 5 by the branch 5b, while the third map is connected at input to the first input connection 4 by the branch 4c and to the second input connection 5 by the branch 5c.

The power supply control system 1 moreover comprises a switchover means 9 connected at input to the first map by the connection 6a, to the second map 7 by the connection 7a and to the third map 8 by the connection 8a. The switchover means 9 is moreover connected at input to the estimating means 10 by the connection 10a and to the sensor 11 by the connection 1ia. The switchover means 9 is also connected at input to the switch 3 by the connection 3a. The switch 3 may be a control means that emits a two-state logic signal.

The switchover means 9 is connected at output to a means 12 of control of the voltage of the rotor and of the stator of the electric machine by the connection 12a.

During operation, the switchover means 9 places the connection 12a in communication with one or other of the connections 6a, 7a or 8a, on the basis of the signals received on the connections 10a, 10b and 3a.

By default, the switchover means 9 transmits at output toward the means 12 of controlling the supply of power to the rotor and stator of the electric machine, the electric machine phase supply current values that are determined by the first map 6 on the basis of the torque request T and rotational speed request N received on the input connections 4, 5.

As soon as the switching means 9 receives an activation signal via the connection 3a, it begins to monitor the rotor and stator temperatures.

The switchover means 9 determines whether the rotor temperature Trot received on the connection 10a is above the value of the first threshold SI and whether the difference between the rotor temperature Trot and the stator temperature Tstat received on the connection 1ia is above a value of a second threshold S2, the switch 9 places the connection 12a in communication with the connection 7a. S1S3S3S2S4S4 the value of the first threshold, for example 82° C., and the value of the second threshold, for example 30° C., are predetermined and stored in memory in the switchover means 9. Thus, the switchover means 9 transmits at output toward the electric machine rotor and stator power supply control means 12 the electric machine phase supply current values determined by the second map 7 on the basis of the torque T and rotational speed N request received on the input connections 4, 5. That has the effect of reducing the current in the rotor and of increasing the current in the stator. The overall power of the electric machine is maintained but the increase in temperature of the rotor is slowed or halted. The onset of power limitation is thus pushed back or avoided.

If the stator temperature Tstat is above a third threshold S3, for example 96° C. and the difference between the stator temperatures Tstat and the rotor temperature Trot is above a fourth threshold S4, for example 30° C., the switchover means 9 places the connection 12a in communication with the connection 8a. Thus, the switchover means 9 transmits at output toward the electric machine rotor and stator power supply control means 12 the electric machine phase supply current values determined by the third map 8 on the basis of the torque T and rotational speed N request received on the input connections 4, 5. That has the effect of reducing the current in the stator and of increasing the current in the rotor. The overall power of the electric machine is maintained but the increase in stator temperature is slowed or halted. The onset of power limitation is thus pushed back or avoided.

The values of the first threshold SI and of the third threshold S3 have the same value or different values depending on the structure and performance of the rotor and of the stator. The same is true of the values of the second threshold S2 and of the fourth threshold S4.

The switchover means 9 can also place the connection 12 back in communication with the first map 6 if the conditions for activation of the second map or of the third map are no longer satisfied.

Alternatively, thresholds other than those that the expression defining the conditions for activation of the second map or of the third map have to satisfy may be provided. Thus, it is possible to define a degree of hysteresis limiting fluctuations caused by the switching back and forth between the use of the first map and the use of one or other of the second or third maps when the values derived from the expressions governing the switching between two maps are close to the thresholds. For example, a 10° C. difference in the values of the thresholds SI to S4 may be considered in order to define a degree of hysteresis.

The use of the second or third map entails the use of electric machine phase supply currents which are not optimized for limiting electrical losses. That implies a reduction in the range of vehicle but allows the electric machine to be protected while keeping its achievable torque at a maximum. That is particularly advantageous during spot heating.

However, if the temperature of the rotor and the temperature of the stator are too close, the power supply control system 1 is no longer activated because it would have a tendency to speed up the return to rotor or stator power limitation. This is because, were it to be activated, the control system would make it easier for the temperature of the rotor or of the stator to increase, thus shortening the time before power limitation was activated.

It is also possible to plan for a change in map only when the torque request is low, in order to avoid jolts when changing mode. Thus, when the conditions for changing map are satisfied, the change is delayed to the next "lifting" of the accelerator pedal. This is possible because the temperature increases if there is a high demand placed on the motor (notably high torque) but does not have time to drop back down again in a brief lifting of the foot allowing the torque request to drop back below the torque threshold.

Figure 2:
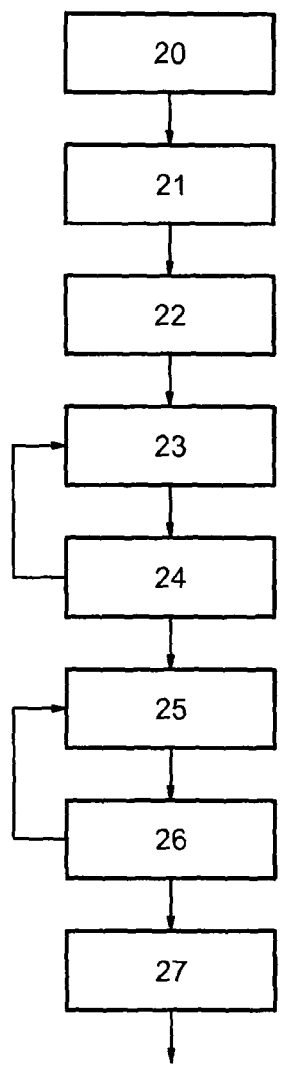
FIG. 2 illustrates the key steps in the method for controlling the supply of power.

The method for controlling the supply of power to the rotor and stator of an electric machine which is illustrated in FIG. 2 comprises the following steps.

During a first step 20, a torque T and rotational speed N setpoint for the electric machine 2 is received. During a step 21, the stator temperature Tstat and the rotor temperature Trot are determined. Next, the difference between the stator temperature Tstat and the rotor temperature Trot is determined during a step 22.

During a step 23, if the rotor temperature Trot is above a second threshold value and the difference between the rotor temperature Trot, and the stator temperature is above a third threshold value, the method continues to step 24 during which electric machine power supply phase current values that are optimized for reducing losses in the rotor and increasing losses in the stator are transmitted, otherwise the method continues to step 25.

During a step 25, if the stator temperature Tstat is above the value of the third threshold S3, and the difference between the stator temperature Tstat and the rotor temperature Trot is above the value of the fourth threshold S4, the method continues to step 26 during which electric machine power supply phase current values that are optimized for increasing losses in the rotor and decreasing losses in the stator are transmitted, otherwise the method continues to step 27.

During a step 27, electric machine power supply phase current values that are optimized for limiting electrical losses are transmitted.

The method is repeated as soon as new values are received in step 20 or measured in step 21.

Step 25 continues for as long as the conditions of step 24 are met. Likewise, step 26 continues for as long as the conditions of step 25 are met.

It is also possible to pass directly from step 22 to step 27 if the difference between the temperature of the rotor and the temperature of the stator is below the value of the second threshold S2 and of the fourth threshold S4.

Steps 24a and 26a may also be provided, these coming in immediately after steps 24 and 26 respectively, and during these steps the rotor and stator temperatures and the difference between the rotor temperature and the stator temperature are compared against thresholds different than the thresholds of steps 23 and 25 respectively. Different thresholds make it possible to introduce hysteresis that limits fluctuating behavior.

A time-delay step 23a and 25a may also be provided, these steps coming in respectively between steps 23 and 24 and between steps 25 and 26. Once the conditions of steps 23 and 25 have been satisfied, the time-delay steps 23a and 25a respectively, defer activation of steps 24 and 26 until it has been detected that the torque request is below the value of the fifth threshold, for example 10 Nm.

The threshold values indicated hereinabove may be adapted according to the electric machine and according to the measurement and estimation systems used (temperature difference, accuracy of the temperature measurement systems, etc.). The ranges of the various thresholds may be defined as follows:

The value of the first threshold SI may be comprised in a range varying from 40° C. to 120° C., for a maximum rotor temperature of 160° C.

The value of the second threshold S2 may be comprised in a range varying from 0° C. to 50° C.

The value of the third threshold S3 may be comprised in a range varying from 50° C. to 140° C., for a maximum stator temperature of 180° C.

The value of the fourth threshold S4 may be comprised in a range varying from 0° C. to 50° C.

The value of the fifth threshold S5 may be comprised in a range varying from 0 Nm to the value of the maximum torque of the electric machine, for example 220 Nm.

The control system and method make it possible to limit differences in temperature between the rotor and the stator of an electric machine in order to delay the power limitation inherent to an excessive increase in temperature. The use of electric machine phase supply current values that optimize losses in the rotor or in the stator allows the torque request from the driver to be met at the expense of range in situations in which motor power would normally be reduced.

The invention claimed is:

1. A control system for controlling a supply of power to an electric machine of a motor vehicle and which contributes to propulsion of the vehicle, the control system being connected at an input to first processing circuitry configured to estimate a temperature of a rotor of the electric machine and to a temperature sensor that measures a temperature of a stator of the electric machine, the control system comprising:

a first currents map that is optimized for limiting electrical losses;

a second currents map that is optimized for reducing losses in the rotor and increasing losses in the stator; and a third currents map that is optimized for increasing losses in the rotor and decreasing losses in the stator, wherein the first, second and third maps contain a set of values allowing determination of electric machine supply currents on the basis of torque and rotational speed request values received at the input to the control system; and second processing circuitry configured to select one of the first, second and third maps on the basis of signals from the first processing circuitry estimating the temperature of the rotor and from the stator temperature sensor, and transmit supply current signals resulting from the selected one of the first, second and third maps to the electric machine.

2. The control system as claimed in claim 1, wherein the second processing circuitry is further configured to delay transmission of the supply current signals resulting from the selected one of the first, second and third maps on the basis of the torque request value.

3. The control system as claimed in claim 1, wherein the second processing circuitry is further configured to select the one of the first, second and third maps on the basis of differences between the temperature of the rotor obtained from the signals from the first processing circuitry estimating the temperature of the rotor and a temperature of the stator obtained from the stator temperature sensor.

4. A method for controlling a supply of power to an electric machine of a motor vehicle and which contributes to propulsion of the vehicle, the electric machine including a rotor including a first processing circuitry configured to estimate temperature and a stator including a temperature sensor, the method comprising:

receiving an electric machine torque and rotational speed request;

determining a temperature of the stator and a temperature of the rotor;

determining a difference between the temperature of the stator and the temperature of the rotor;

determining at least two electric machine supply current values that satisfy the torque and rotational speed request;

selecting, by a second processing circuitry, a supply current value on the basis of the temperature of the stator and of the temperature of the rotor so that if the rotor temperature is above a value of a first threshold and the difference between the rotor temperature and the stator temperature is above a value of a second threshold, the value chosen is a value from the electric machine supply current values that are optimized for reducing losses in the rotor and increasing losses in the stator; and transmitting, by the second processing circuitry, the selected supply current value to the electric machine.

5. The method as claimed in claim 4, wherein, if the stator temperature is above a value of a third threshold and the difference between the stator temperature and the rotor temperature is above a value of a fifth threshold, the value chosen is a value from the electric machine supply current values that are optimized for increasing losses in the rotor and reducing losses in the stator.

6. The method as claimed in claim 4, wherein, if the difference between the rotor temperature and the stator temperature is less than the value of the second threshold, the value chosen is a value from the electric machine supply current values that are optimized for limiting electrical losses.

7. The method as claimed in claim 4, wherein the transmission of the electric machine supply current values is deferred until it has been determined that the torque request is below a value of a fifth threshold.

8. A control method for controlling a supply of power to an electric machine of a motor vehicle and which contributes to propulsion of the vehicle, the method comprising:

estimating, using a first processing circuitry, a temperature of a rotor of the electric machine;

measuring, using a temperature sensor, a temperature of a stator of the electric machine;

obtaining a first currents map that is optimized for limiting electrical losses;

obtaining a second currents map that is optimized for reducing losses in the rotor and increasing losses in the stator;

obtaining a third currents map that is optimized for increasing losses in the rotor and decreasing losses in the stator, wherein the first, second and third maps contain a set of values allowing determination of electric machine supply currents on the basis of torque and rotational speed request values received at the input to a control system;

selecting one of the first, second and third maps on the basis of the estimated temperature of the rotor and the measured temperature of the stator;

generating, by current supply circuitry, supply current signals based on the selected one of the first, second and third maps; and transmitting supply current signals resulting from the selected one of the first, second and third maps to the electric machine.

* * * * *